Patented Sept. 27, 1938

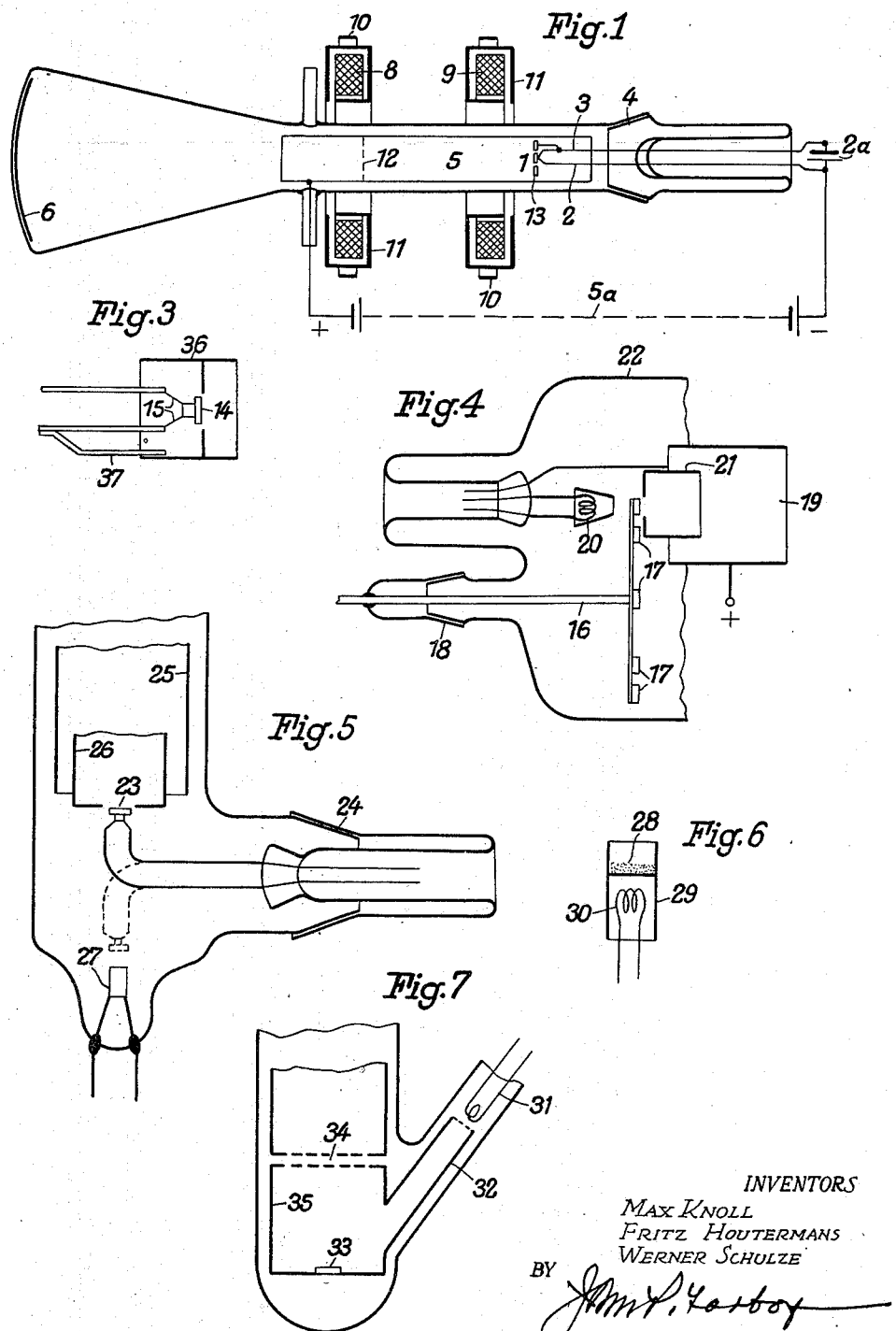

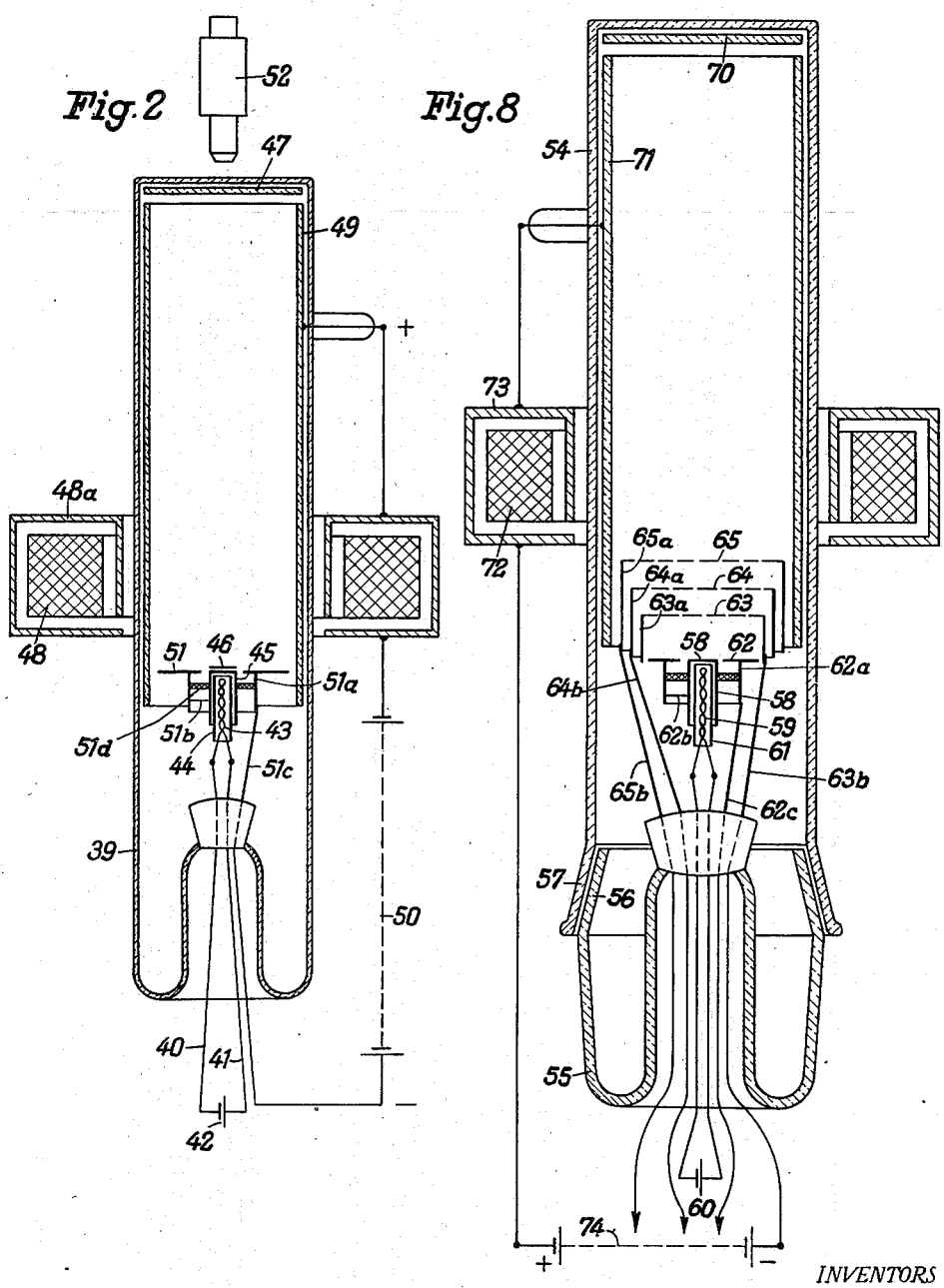

2,131,536

UNITED STATES PATENT OFFICE

2,131,536

ELECTRON MICROSCOPE

Max Knoll, Berlin-Westend, Germany, Fritz Georg Houtermans, Hayes, England, and Werner Schulze, Berlin-Charlottenburg, Germany Application June 23, 1934, Serial No. 732,046 In Germany March 16, 1932

9 Claims. (Cl. 250—27.5)

The invention relates to improvements in electron-microscopes for observing and examining materials emitting electrons and for observing objects exposed to or permeated by a ray of electrons, especially for observing heated materials. The main object of these improvements is to obtain images non-distorted even if enlarged on a great scale and to provide an instrument which shall be simple in construction, accurate in its results and easily to be handled. Further this instrument shall be adapted to be adjusted according to the conditions which may occur in practice and which may be extremely different. Such conditions are the special kind of the substance or the object to be observed, the desired scale of enlargement which may be within wide limits, and the desired short time of exposure. Furthermore are important the requirements which are necessary if the exposures are to be repeated in order to examine the alterations of the respective surface, or if a comparative observation and examination of different materials is to be made, in either case without altering in any way the conditions of the experiment.

Experiments made before this invention (compare the article of Knoll & Ruska "Annalen der Physik", volume 32, 1932, p. 607 ff.) have shown, that by means of a cold cathode exact images of a grid can be obtained.

But the instrument there described was not at all suitable for observing the emission of incandescent surfaces. The applicants have demonstrated by experiments that by means of the instrument there described an image of a hot-cathode can only be obtained with very great distortions.

By means of systematic research the applicants have found out that the cause of such distortions consists in the formation of disturbing fields, i. e. of such electric or magnetic fields (especially in the proximity of the surface to be observed) which have a considerable inhomogeneity, and that exact images can be obtained regularly, if such disturbing fields are avoided.

The object of the invention is on the one hand to provide practical forms and arrangements of electron-microscopes which must be especially adapted for technologically observing the emission of electrons, respectively for observing both the surface and thin layers of suitable materials by means of electrons. On the other hand, the invention provides forms and arrangements of electrodes which do not impair in any way the images to be obtained by the electron lenses.

While the term "electron-microscope" has been used to designate the invention, it is to be understood that all the embodiments thereof may utilize an electric-ray consisting of ions instead of electrons, without substantial physical change or variation in general operation or relation of parts, and that where the term electric-ray is used it is intended to include both electronic rays and ionic rays.

First of all it has been found that the emitting surface to be depicted must be an exactly plain and continuous one and must stand perpendicularly to the axis of the depicting electron beam. If by any reason, e. g. with regard to the required heating current, the emitting surface must be a small one, and if thereby the electric field in the proximity of the emitting surface is an inhomogeneous one, this inhomogeneity can be annihilated by a Wehnelt-cylinder or protection ring surrounding the surface of the object or can be transferred to the outer edge of the Wehnelt-cylinder or the protection ring, where it does not impair the image.

Especially adapted for heating the plain surface of the object is the method of heating indirectly the object by known means (e. g. by electron-bombardment or by heat contact with an incandescent filament or by a bifilar helical filament mounted in a small insulating tube).

A further advantage of the method of heating indirectly is, that in spite of the high heating currents required the strength of the magnetic field existing in the proximity of the surface of the object can be a very small one.

By using an object-electrode having a great heat inertia the influence of the magnetic field of the heating current can be eliminated since the heating current can be interrupted during observation.

A low strength of the magnetic or electric field in the neighbourhood of the counter electrode (i. e. in the electron-microscope: the anode) will be attained and the depicting of the object-electrode will not be hindered by the counter electrode or anode, if the counter electrode or anode is not formed in usual manner as a diaphragm or a grid, but as a tube which surrounds the object to be depicted as a mantle.

It is essential for the good quality of the image to arrange the electrodes exactly concentric both one to another and to the depicting field. According to the invention the defects of the image which result from the fact, that the condition of the concentricity is not completely fulfilled, can be compensated in the following way: The carrier of the material to be observed is excentrically mounted in the vacuum tube (e. g. by means of a gas tight stopper), so that it can revolve round this excentric axis.

Furthermore by mounting the carrier excentrically to the counter electrode it is possible to observe one after the other a number of materials fixed on the carrier without interrupting the vacuum, by simply shifting the different materials one after the other into the position which they must occupy for obtaining a non-distorted image.

The same or a similar arrangement can be used in connection with a side tube for introducing materials to be especially prepared within the tube for observation without exposure to the air (e. g. covering the cathode while within the tube by a vapour beam of metal as barium, caesium or the like with a layer emitting electrons), so that the object after this preparing measure need not come any more into contact with the atmosphere. A similar arrangement can be used for interchanging objects exposed to or permeated by rays of electrons.

Furthermore in order to avoid inhomogeneous disturbing fields in the proximity of the object to be depicted the object can be depicted by reflected rays instead of direct rays. The rays can be produced by a separate side electrode device and can be cast upon the material to be observed.

By the same reason it may be preferable in some cases to generate the electrons on the surface of the material to be observed photo-electrically, e. g. by means of a source of light- or Röntgen-rays arranged outside of the tube, the rays being cast upon the said surface.

By fixing a metallic conductive coating upon non-conductive surfaces of the tube wall or upon non-conductive objects put into the path of the electron rays the formation of disturbing electric charges on the said surfaces can be avoided.

The enlargement attainable by one proceeding is limited by the stray field of the electron lens which lens is approached as close as possible to the object to be depicted. If the strength of this stray field exceeds a certain lowest limit, distortions of the images are likewise produced. The invention avoids these distortions by first producing the image on the fluorescent screen only moderately enlarged, then to enlarge it by a light-optical lens device, e. g. by an usual microscope and only then to observe it or photograph it.

In the latter case, if the enlargement has to be a very great one the fineness of the grain of the fluorescent screen is very important for the success. Since in the usual fluorescent materials the attainable enlargement is limited by the coarseness of the grain, according to the invention the fluorescent screen consists of a substance sufficiently amorphous, e. g. a cellulose derivative and a substance excitable by cathode rays in the form of a monocrystal, e. g. of an alkali chloride with an addition of a heavy metal (tungsten).

In the drawings some embodiments of the invention are shown.

Fig. 1 shows an electron-microscope in section.

Fig. 2 shows an electron tube which due to its simpleness and cheapness is especially suitable for factories in order to observe and examine cathode materials or the like.

Figs. 3–6 show different forms of object electrodes.

Fig. 7 shows an electrode device for observing and examining materials or objects by means of reflected rays.

Fig. 8 shows a device for observing and examining a complete electrode system.

The electron-microscope shown in Fig. 1 comprises the cathode (incandescent filament) 1, heated indirectly by contact with a glowing wire 2, 3 connected with the two poles of the heating battery 2a. A protection ring 13 surrounds the filament 1. The conducting wires 2, 3 are fixed on the conical stopper 4. 5 is the tube-shaped anode. The cathode 1 and the anode or driving electrode 5 are connected with the two poles of the anode-battery 5a. The image of the cathode is produced upon the observation screen 6. 8 and 9 are the electron lenses (collecting coils) for producing the image. They are suspended in universal joints 10 and provided each with a slitted iron mantle 11 in order to reduce their stray field. A control grid 12 in the plane of the intermediate image produced by the collecting coil 9 serves as an "ocular micrometer" in order to measure out the observed phenomena.

In Fig. 2 a simple and cheap electron microscope is shown, which produces on the screen an image of a moderate enlargement, which is observed or photographed by means of a microscope with great enlargement. For the main scope of the invention (to provide an apparatus, by which in factories the materials can be easily observed and examined) such an apparatus has the important practical advantage, that the electron-tubes have small dimensions and are cheap to manufacture. 39 is an evacuated glass tube into which are sealed the wires 40 and 41 connecting the heating battery 42 with the two ends of the bifilar heating spiral 43 which is surrounded by an insulating tube 44 consisting of a material such as alumina. The tube 44 bears the metal (e. g. nickel) cathode 45 upon which is deposited the material 46 to be observed, e. g. baryta. The cathode 45 is formed as a cup and is surrounded by a metal protection ring 51 which is supported by a metal cylinder 51a. This cylinder 51a is connected with the cathode 45 by a wire 51b and is supported by a wire 51c melted into the tube 39 and connected with the negative pole of the anode-battery 50. Between the cathode 45 and the cylinder 51a a ring plate 51d, made from insulating material, is arranged by which the cathode 45 is held in position. A collecting coil (electron lens) 48 is provided with a slitted iron mantle 48a. On the inner surface of the upper part of the glass tube 39 is deposited a metal layer 49 which serves as anode or main driving electrode. The anode 49 is connected with the positive pole of the anode-battery 50. 47 is the fluorescent screen upon which the image is produced by the electron lens 48. 52 is an optic microscope which can be used for a great number of such apparatus 39—51.

Fig. 3 shows on an enlarged scale an object electrode 14 with plain emitting surface which is heated indirectly by conduction of the heat of the tungsten wire 15. The cathode 14 is surrounded by the protection ring and Wehnelt-cylinder 36 which is supported by the carrier 37.

Fig. 4 shows a turnable object-electrode 16 with a plurality of deposits 17. The electrode 16 is rigidly connected with the conical stopper 18. By turning the stopper 18 one can bring any of the deposits 17 one likes into the position concentrical to the counter electrode 19 i. e. into the position where they can be depicted. 20 is a subsidiary cathode with a device for concentrating the rays which it emits. The materials to be observed can be heated by the subsidiary cathode 20 by means of electron bombardment. 21 is a Wehnelt-cylinder (protection ring)-electrode, 22 is the wall of the vacuum tube. The potential of the anode or driving electrode 19 in Fig. 5 is positive and the potential of the object-electrode 16 negative. The tube shown here therefore utilizes electric-rays composed of electrons and more specifically may be termed an electron-microscope. If the two poles are reversed the same device can be used for producing images by electric-rays of positive ions (ion-microscope).

In Fig. 5 the object-electrode 23 is rigidly connected with the turnable stopper 24. By turning the stopper 24 the object-electrode 23 can be turned away from the depicting position (concentric to both the Wehnelt-cylinder 26 and the anode or driving electrode 25) towards the position opposite to the device 27 which serves for forming and preparing the object to be depicted. By means of this device 27 the measures can be taken which are necessary for introducing and preparing the materials to be observed, e. g. cover the object by an electron emitting layer by means of high frequency heating from outside without the object-electrode coming into contact with the atmosphere before the observation takes place.

In Fig. 6 the material 28 to be observed being liquid or powdery is placed in a cup 29 having an axis perpendicular and being heated by means of radiation by the heating wire 30 (or by means of electron-bombardment). This cup 29 serves as electrode and at the same time as Wehnelt-cylinder-protection-ring.

Fig. 7 shows a device which serves for observing the surfaces of materials by means of reflected electron rays. The electron ray is generated by means of the subsidiary cathode 31 and the subsidiary anode 32 and is accelerated in the direction towards the surface of the object 33. The rays reflected by this surface concentrically to the anode 35 are used for depicting the object 33 in an enlarged scale on the fluorescent screen (not shown) by means of an electron lens either directly or after they have passed an accelerating field 34 by which they are made homogeneous.

In order to generate depicting electrons photoelectrically an arrangement can be used similar to the arrangement shown in Fig. 7, whereby instead of the electrode system 31/32 a source of light or Röntgen rays is arranged within or without the tube.

By the device shown in Fig. 8 a complete electrode system, e. g. of an amplifying tube having plane parallel cathodes can be observed and examined. By suitably adjusting the focal distance (by altering the current of the magnetic lens, or by altering the voltage if an electrostatic lens is used) either the plane of the cathode or the plane of any grid can be depicted clearly. Therefore a close analysis can be made in what manner the electron current is distributed in any amplifying or in any transmitting tube (having certain dimensions and a certain amplification factor) or in what manner the thermic or the secondary emission of the different grids is distributed and in what manner it is influenced by suitable treatment of the surfaces etc.

Means can be provided which allow to interchange the electrode systems to be examined. For instance the electron tube can be made of two parts. The one containing the anode, the fluorescent screen and the electron lens (or a plurality of them), and the other containing the whole electrode system. In Fig. 8 the one part is the open glass tube 54 and the other part is the open glass tube 55.

The glass tube 55 is at its open end formed as a conical stopper 56 which can be fitted gas tightly in a corresponding cone 57 provided at the open end of the other part 54. The glass tube 55 contains the cathode 58 heated by the bifilar spiral 59 which is connected with the heating battery 60 and surrounded by the insulating tube 61. The cathode 58 is surrounded by a protection ring 62, which is supported by a metal cylinder 62a. This cylinder 62a is connected with the cathode 58 by a wire 62b and is supported by a wire 62c melted into the tube 55 and connected with the negative pole of the battery 74. 63 is a controlling grid, 64 is a screen grid and 65 is the anode grid (first anode). The three grids 63, 64, 65 are supported by the metal cylinders 63a, 64a, 65a respectively which are supported by the wires 63b, 64b, 65b respectively. The wires 63b, 64b and 65b are sealed into the glass tube 55 and can be connected with any point of the battery 74 or equivalent potential dividing resistance.

The glass tube 54 contains the fluorescent screen 70 and the second anode or driving electrode 71. On the glass tube 54 is adjustably mounted the magnetic electron lens (coil) 72 which is surrounded by a slitted iron mantle 73. The anode 71 and the cathode 58 are connected with the two poles of a battery 74.

By reversal of the direction of the current the apparatus shown and described can be used for producing images by means of ions.

What we claim is:

1. In an electric-ray microscope, an object electrode whose surface is to be depicted, a cylindrical counter electrode, said object electrode being arranged on the axis of said counter electrode and surrounded by the counter electrode near one end of the counter electrode, and a protecting annular conducting element of substantially the same potential as the object electrode surrounding the object electrode substantially in the plane of the surface to be depicted, and spaced between the object electrode and the said counter electrode.

2. In an electric-ray microscope, an object electrode whose surface is to be depicted, a cylindrical counter electrode, said object electrode being arranged on the axis of the counter electrode and formed with the surface to be depicted substantially plane and continuous and positioned substantially perpendicular to the axis of the cylindrical counter electrode, and a protecting annular conducting element of substantially the same potential as the object electrode surrounding the object electrode substantially in the plane of the surface to be depicted, and spaced between the object electrode and the said counter electrode.

3. In an electric-ray microscope, an evacuated envelope, an object electrode in said envelope, electron image focusing means, a stopper element fitted rotatably and gas tight in said envelope eccentric to the said cylindrical counter electrode and carrying said object electrode for movement thereof into and out of a definite focusing relation with said image focusing means.

4. In an electric-ray microscope, a plurality of different object electrodes, an electron image focusing means, and a pivoted carrier for said object electrodes arranged upon rotation to bring the object electrodes one after the other into definite focusing relation with said image focusing means.

5. In an electric-ray microscope, an object electrode, an electron image focusing means, means for preparing the object electrode for observation by electric rays, and an object electrode carrier arranged to move said object electrode out of cooperative relation with said preparing means into definite focusing relation with said image focusing means.

6. In an electric-ray microscope, an object electrode, a counter electrode, means for depositing an electron emitting substance on said object electrode, and a carrier for said object electrode movably mounted with respect to said depositing means and said counter electrode within the microscope, to carry said object electrode from cooperative relation with said depositing means into cooperative relation with said counter electrode.

7. An electron-microscope for observing and examining complete electrode systems comprising, an evacuated envelope, a heated cathode within the envelope adapted to emit electrons, an anode for causing electron rays to be emitted from said cathode, a fluorescent screen in the path of said electron rays, a plurality of grid electrodes intermediate the cathode and the screen, an electrically energized electron lens system between said grids and the screen for bringing said electron rays to a focus on said screen to produce an image thereon, means for preventing the formation of a disturbing field in the path of the electron rays, said electron lens system being adapted to be altered in response to variation in energization to vary its focal distance.

8. An electron-microscope for observing and examining complete electrode systems comprising, an evacuated envelope, a heated cathode within the envelope adapted to emit electrons, an anode for causing electron rays to be emitted from said cathode, a fluorescent screen in the path of said electron rays, a plurality of grid electrodes intermediate the cathode and the screen, an electrically energized electron lens system between said grids and the screen for bringing said electron rays to a focus on said screen to produce an image thereon, means for preventing the formation of a disturbing field in the path of the electron rays, said electron lens system being adapted to be altered in response to variations in energization to vary its focal distance, said envelope being made in two parts arranged to be fitted together with a gas tight joint, one part containing the cathode and the plurality of grids and the other part containing the anode, the fluorescent screen and the electron lens system.

9. In an electric-ray microscope, an image receiving screen, an object electrode to be depicted on the screen, and a single anode only between the object electrode and the screen arranged in the form of a tube having a length greater than its internal diameter and an internal diameter greater than the diameter of the object electrode, said object electrode being positioned within the tubular anode so as to be surrounded by the anode, together with electromagnetic focusing means surrounding the tubular anode intermediate the ends thereof.

FRITZ GEORG HOUTERMANS.
MAX KNOLL.
WERNER SCHULZE.